Feb. 10, 1953  C. P. HOLDERITH  2,628,057
WATER FAUCET
Filed Sept. 2, 1949
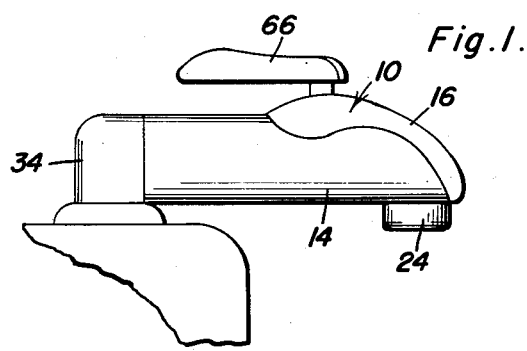
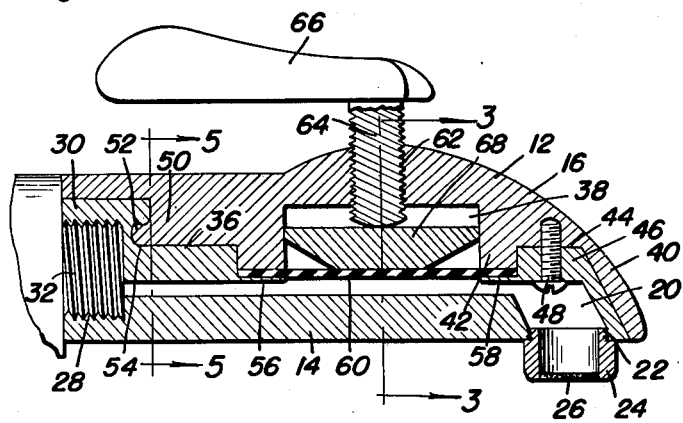
Clarence P. Holderith
INVENTOR.

Patented Feb. 10, 1953

2,628,057

UNITED STATES PATENT OFFICE 2,628,057

WATER FAUCET

Clarence P. Holderith, Kokomo, Ind.

Application September 2, 1949, Serial No. 113,685

2 Claims. (Cl. 251—24)

1

This invention appertains to a valve unit, which is especially adapted for use in fluid pressure lines.

A primary object of the instant invention is to effectively and dependably regulate the flow of fluid under high pressure and to completely close off and block the flow of the fluid, in such a manner as to prevent the development of leaks or drips.

Another important object of this invention is to provide a valve mechanism, especially designed for regulating and shutting off the flow of water under pressure, which includes an actuatable sealing member, the sealing member being so constructed, arranged and actuated that concentric or abrasive action on the member itself is prevented.

Another important object of this invention is to provide a sectional valve housing, including a pair of complementary sections, means being provided for securely locking the sections together to prevent the development of leaks or drips, one of these sections having a longitudinal groove formed on its inner face, whereby an axial passage through the housing is defined when the sections are locked together.

Another important object of this invention resides in the provision of a flexible diaphragm operatively clamped between the sections and mounted above the axial passage for closing off the flow of fluid therethrough, the diaphragm being activated by means of a slidably disposed plug or block which is mounted above the diaphragm and which is actuated by a screw-threaded handle.

These and ancillary objects and structural features of merit are attained by this invention, the preferred embodiment of which is set forth in the following description and illustrated in the accompanying drawings, wherein:

Figure 1 is a view in perspective of the improved faucet or valve, constructed in accordance with this invention;

Figure 2 is a longitudinal vertical sectional view thereof;

Figure 3 is a transverse sectional view thereof, taken on line 3—3 of Figure 2;

Figure 4 is a longitudinal vertical sectional view, illustrating the diaphragm in a closed position to block off the flow of fluid through the passage;

Figure 5 is a transverse sectional view taken on line 5—5 of Figure 2, illustrating the preferred means for locking the sections of the housing together; and

2

Figure 6 is a plan view of the upper section of the housing.

Referring now more particularly to the accompanying drawing, the reference numeral 10 generally designates the improved faucet, which includes a housing 12 consisting of a pair of complementary sections 14 and 16. The section 14 is formed on its inner face with a longitudinally extending semi-circular groove 18, the groove terminating at its outer end in a transversely disposed discharge orifice 20, the outer end of which is internally threaded as at 22. A sleeve 24 is threaded in the outer end of the orifice and a straining screen 26 is transversely positioned across the lower end of the sleeve.

An enlarged threaded bore 28 is axially formed in the rear enlarged end 30 of the section 14 to receive the reduced threaded fitting 32 carried by a connection 34, whereby the section is detachably secured to the fluid line or conduit.

It is to be particularly noted that the section 14 is formed at its rear end with upwardly extending steps 36, for a purpose to be described.

The housing section 16 is adapted to be detachably locked on the section 14, the section 16 having a transversely disposed channel or opening 38 formed in its inner face, adjacent the center thereof. It is to be noted that the forward portion of the section terminates in a downwardly extending tongue 40, the tongue being spaced outwardly from a depending shoulder 42. The tongue and shoulder define a slot 44 for receiving the protruding portion 46 of the section 14. Thus, the tongue 40 encloses the front portion of the lower section, the protruding portion of the lower section 46 being seated in the slot 44 and secured therein by means of a vertically disposed locking screw 48 extending through the section and into the upper housing section 16. The rear portion of the upper section 16 is formed with steps 50 complementary to the step portions 36 on the section 14 and seated thereon. Means is provided for locking the rear portions of the housing sections together, and preferably includes a tongue 52 formed on the rear stepped portion of the section 16, which is adapted to fit in a groove 54 formed in the stepped portion of the section 14.

A flange 56 projects forwardly from the rear stepped portion of the section 14 and a complementary flange 58 projects rearwardly from the upstanding portion 46 on the front of the section, the flanges receiving a diaphragm 60 which is clamped thereon by means of the upper section 16. The upper section 16, when secured to the lower section, clamps the diaphragm above the groove 18, the diaphragm being in alignment with the opening 38 in the section 16. A vertical threaded opening 62 is formed in the section 16 in alignment with the opening 38, a threaded stem 64 being rotatably disposed in the threaded opening 62 and a laterally extending handle 66 being fixed to the upper end of the stem.

It can thus be seen that the diaphragm 60 is mounted above the axial passage, defined by the longitudinally extending groove 18, when the sections are locked together by means of the locking tongue and groove 52 and 54 formed on the rear portions thereof and the locking screw 48 extending vertically through the front portions of the sections. A block or plug 68, which is preferably wedge-shaped, is slidably disposed in the opening 38 and the stem 64 bears on the upper face thereof to force the lower face into urging engagement of the diaphragm 60. Thus, as seen in Figure 4, by rotating the handle 66, the diaphragm is moved downwardly to close off the passage between the sections, so that the diaphragm is at right angles to the flow and the flow is completely blocked off. It can be appreciated that the diaphragm 60 actually serves as the inner face or wall of the section 16 to close off the opening 38 therein, the diaphragm being depressed by the actuating means consisting of the plug and rotating stem to engage against the surface of the groove and seal off the water flow. Also, it is to be noted that the two castings or sections forming the housing are securely locked together by means of the interengaging tongue and groove formed on the rear portions thereof, the sections being drawn tightly together by means of the assembly screw 48. The locking means for the two sections are thus completely concealed from the exterior surfaces of the housing.

It can be appreciated that the sections can be easily cast, due to their smooth and simple surfaces, and that the sections can be easily secured together to form the improved faucet, the faucet having an improved, easily actuated and effective permanently tight seal, the seal being actuated without any abrasive action and, when closed, preventing the possibility of leakage.

Having described the invention, what is claimed as new is:

1. A valve comprising a housing including first and second elongated sections, said first section having a longitudinally extending passage therein terminating at one end in a transverse discharge orifice, said first section having a transverse opening therein intermediate the ends thereof communicating with said passage, said second section being disposed on said first section and overlying the transverse opening therein, a diaphragm disposed in said transverse opening between said sections to seal said opening, an interengaging tongue and groove connection between the ends of said sections remote from said discharge orifice, a fastener extending through the end of said first section adjacent said discharge orifice and into the adjacent end of said second section to detachably hold said sections together, and means carried by said second section for forcing said diaphragm into said passage.

2. A valve comprising a housing including first and second elongated sections, said first section having a longitudinally extending passage therein terminating at one end in a transverse discharge orifice, said first section having a transverse opening therein intermediate the ends thereof communicating with said passage, said second section being disposed on said first section and overlying the transverse opening therein, a diaphragm disposed in said transverse opening between said sections to seal said opening, an interengaging tongue and groove connection between the ends of said sections remote from said discharge orifice, a headed fastener extending through the end of said first section adjacent said discharge orifice and into the adjacent end of said second section to detachably hold said sections together, and means carried by said second section for forcing said diaphragm into said passage, said fastener being so constructed and arranged to have the head thereof disposed in said passage adjacent said discharge orifice.

CLARENCE P. HOLDERITH.

REFERENCES CITED

The following references are of record in the file of this patent:

UNITED STATES PATENTS

| Number | Name | Date |
|---|---|---|
| 548,048 | Good | Oct. 15, 1895 |
| 1,024,876 | Barbour | Apr. 30, 1912 |
| 1,992,043 | Saunders | Feb. 19, 1933 |

FOREIGN PATENTS

| Number | Country | Date |
|---|---|---|
| 527,917 | Great Britain | of 1940 |
| 614,351 | Germany | of 1935 |
| 882,556 | France | of 1943 |